United States Patent
Lien et al.

(10) Patent No.: US 10,420,074 B2
(45) Date of Patent: Sep. 17, 2019

(54) BASE STATION AND USER EQUIPMENT

(71) Applicant: Institute For Information Industry, Taipei (TW)

(72) Inventors: Shao-Yu Lien, Pingtung County (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/836,813

(22) Filed: Dec. 8, 2017

(65) Prior Publication Data

US 2019/0166581 A1 May 30, 2019

(30) Foreign Application Priority Data

Nov. 24, 2017 (TW) .............................. 106140973 A

(51) Int. Cl.
*H04L 5/00* (2006.01)
*H04W 72/02* (2009.01)
*H04W 72/04* (2009.01)

(52) U.S. Cl.
CPC ....... *H04W 72/02* (2013.01); *H04W 72/0413* (2013.01)

(58) Field of Classification Search
CPC ..... H04L 5/0026; H04L 5/003; H04L 5/0044; H04L 5/0048; H04W 52/146; H04W 52/346; H04W 72/02; H04W 72/0413
See application file for complete search history.

(56) References Cited

U.S. PATENT DOCUMENTS

| | | | |
|---|---|---|---|
| 2016/0353424 A1 | 12/2016 | Stirling-Gallacher et al. | |
| 2017/0155484 A1* | 6/2017 | Kang | H04L 1/06 |
| 2018/0027535 A1* | 1/2018 | Guo | H04W 72/04 370/329 |
| 2018/0192387 A1* | 7/2018 | Jung | H04W 48/20 |
| 2018/0205506 A1* | 7/2018 | Ren | H04L 5/0001 |
| 2018/0375551 A1* | 12/2018 | Song | H04B 7/0456 |

FOREIGN PATENT DOCUMENTS

| | | |
|---|---|---|
| CN | 106304349 A | 1/2017 |
| TW | 201733325 A | 9/2017 |
| WO | 2017197075 A1 | 11/2017 |

OTHER PUBLICATIONS

Office Action to the corresponding Taiwan Patent Application rendered by the Taiwan Intellectual Property Office (TIPO) on Dec. 24, 2018, 15 pages (including English translation).

* cited by examiner

*Primary Examiner* — Phuc H Tran
(74) *Attorney, Agent, or Firm* — Skaar Ulbrich Macari, P.A.

(57) ABSTRACT

A base station and a user equipment are provided. The base station performs a multi-user non-orthogonal uplink multiplexing transmission configuration procedure to generate an uplink multiplexing transmission configuration message based on a radio resource utilization efficiency. The uplink multiplexing transmission configuration message carries a power domain uplink multiplexing transmission parameter and a non-orthogonal uplink multiplexing transmission parameter. The base station transmits the uplink multiplexing transmission configuration message to the user equipment to make the user equipment transmit an uplink data signal to the base station according to the uplink multiplexing transmission configuration message.

20 Claims, 7 Drawing Sheets

BASE STATION AND USER EQUIPMENT

PRIORITY

This application claims priority to Taiwan Patent Application No. 106140973 filed on Nov. 24, 2017, which is hereby incorporated by reference in its entirety.

FIELD

The present invention relates to a base station and a user equipment. More particularly, the base station transmits an uplink multiplexing transmission configuration message carrying a power domain uplink multiplexing transmission parameter and a non-orthogonal uplink multiplexing transmission parameter to the user equipment based on a radio resource utilization efficiency so that the user equipment transmits uplink data to the base station based on the uplink multiplexing transmission configuration message.

BACKGROUND

With the rapid development of wireless communication technologies, wireless communication has found wide application in people's life, and people's demand for wireless communication is increasing. Current 4G mobile communication systems (or called Long Term Evolution (LTE) systems) adopt discrete-Fourier Transform spread orthogonal frequency division multiplexing (DFT-s-OFDM) for uplink transmission so as to avoid mutual interference between different user equipments. Therefore, in the 4G mobile communication systems, a base station allocates different time-frequency radio resources to different user equipments for uplink data transmission. In other words, the radio resources allocated to the user equipments by the base station currently for uplink data transmission are orthogonal in the time-frequency domain.

However, in the case where physical radio resources are very limited and most of frequency spectrums being used belong to licensed frequency bands that need to be paid, frequency spectrum resources owned by providers are becoming insufficient for use gradually because of the increasing number of user equipments and the enormous transmission amount required by audio and video applications. In this situation, the latency in uplink data transmission of the user equipments may be increased so that demands of users cannot be satisfied especially for some applications, e.g., applications with ultra-reliable low latency transmission requirements such as Internet of Vehicles and Industrial Control or the like.

Accordingly, an urgent need exists in the art to provide an uplink multiplexing transmission configuration mechanism so as to improve the radio resource utilization efficiency and reduce the latency in uplink data transmission.

SUMMARY

An objective of the present invention is to provide an uplink multiplexing transmission configuration mechanism, which enables a base station to perform a multi-user non-orthogonal uplink multiplexing transmission (MU-NOMT) configuration procedure based on a radio resource utilization efficiency so that uplink transmission resources of different user equipments are at least partially overlapped, thereby improving the overall radio resource utilization efficiency and reducing the time delay in uplink data transmission of the user equipment.

To achieve the aforesaid objective, the disclosure includes a base station which comprises a storage, a transceiver and a processor. The processor is electrically connected to the storage and the transceiver and is configured to execute the following operations: performing an MU-NOMT configuration procedure based on a radio resource utilization efficiency to generate an uplink multiplexing transmission configuration message, the uplink multiplexing transmission configuration message carries a power domain uplink multiplexing transmission parameter and a non-orthogonal uplink multiplexing transmission parameter; and transmitting the uplink multiplexing transmission configuration message to a user equipment via the transceiver so that the user equipment transmits an uplink data signal to the base station based on the uplink multiplexing transmission configuration message.

Moreover, the disclosure also includes a use equipment which comprises a storage, a transceiver and a processor. The processor is electrically connected to the storage and the transceiver and is configured to execute the following operations: receiving an uplink multiplexing transmission configuration message from a base station via the transceiver, the uplink multiplexing transmission configuration message carrying a power domain uplink multiplexing transmission parameter and a non-orthogonal uplink multiplexing transmission parameter; and transmitting an uplink data signal to the base station based on the uplink multiplexing transmission configuration message.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular examples, embodiments, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
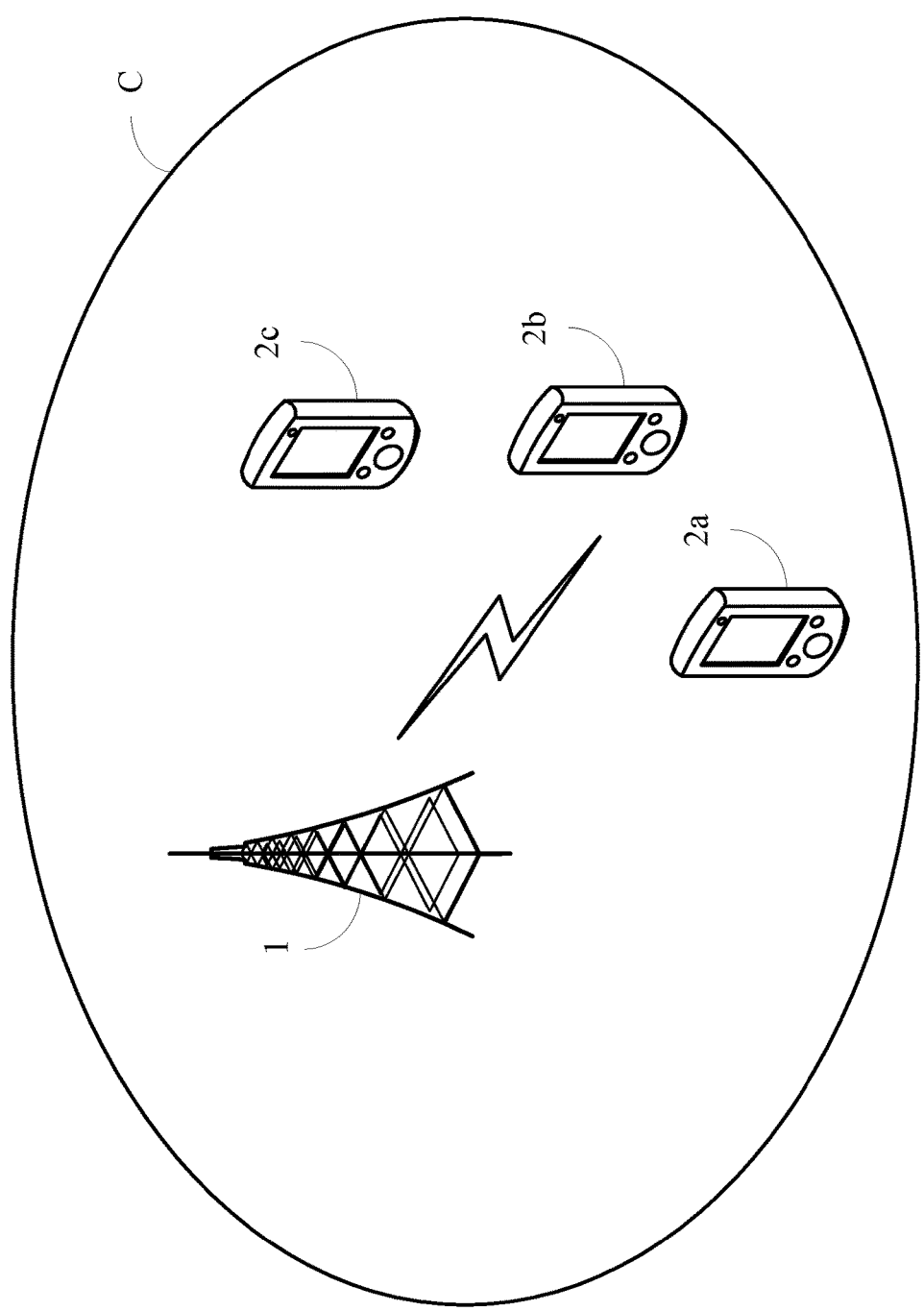
FIG. 1 depicts an implementation scenario of a communication system according to the present invention.
Figure 2A:
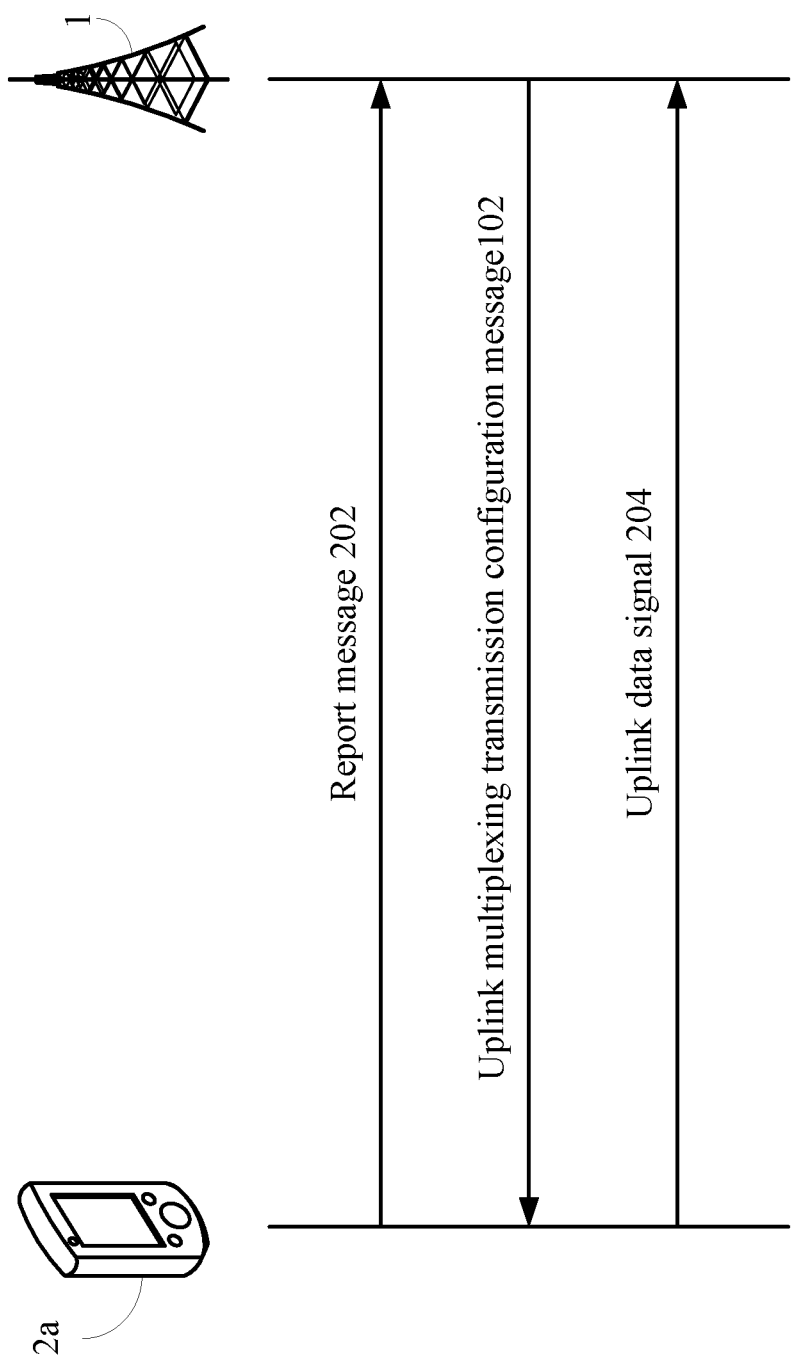
FIG. 2A depicts an implementation scenario of signal transmission between a base station 1 and a user equipment 2a according to the present invention.
Figure 2B:
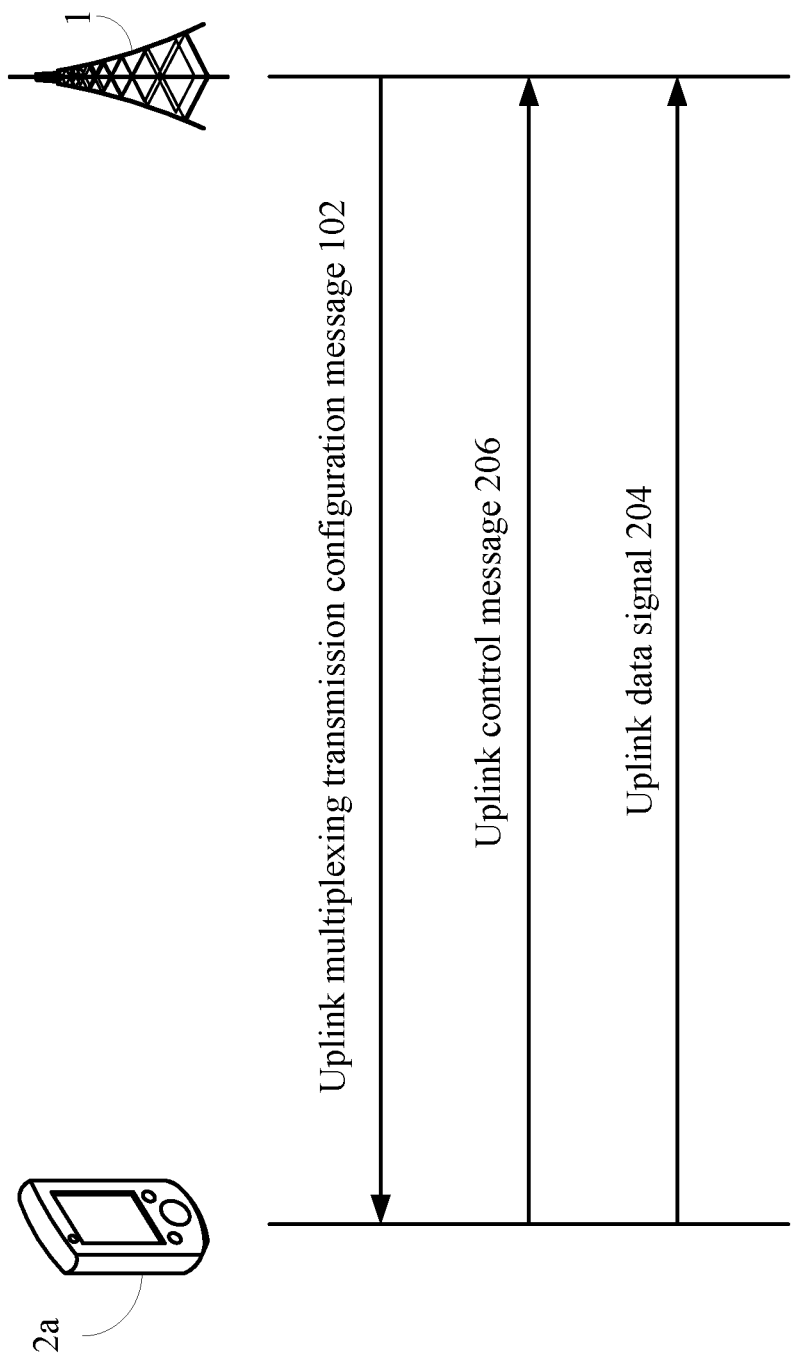
FIG. 2B depicts another implementation scenario of signal transmission between the base station 1 and the user equipment 2a according to the present invention.
Figure 2C:
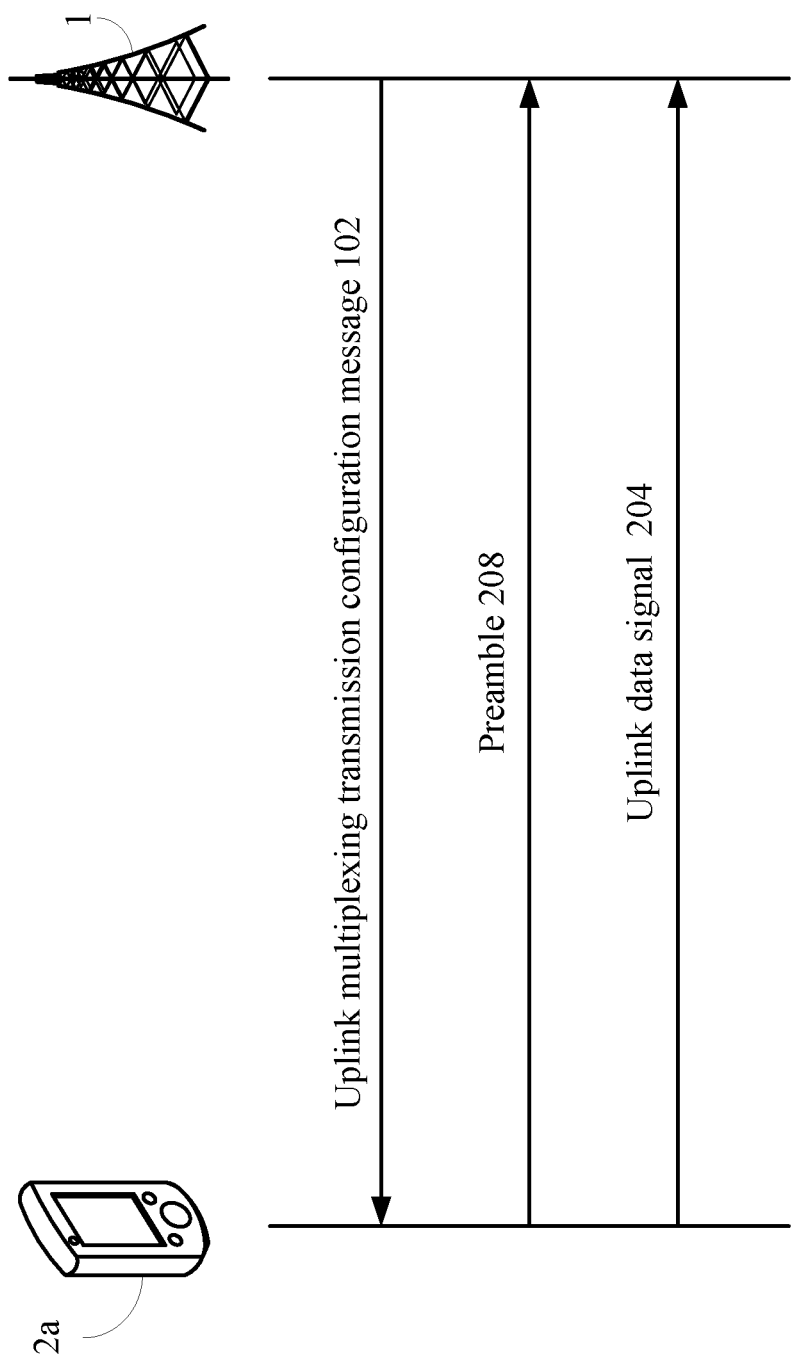
FIG. 2C depicts another implementation scenario of signal transmission between the base station 1 and the user equipment 2a according to the present invention.
Figure 3:
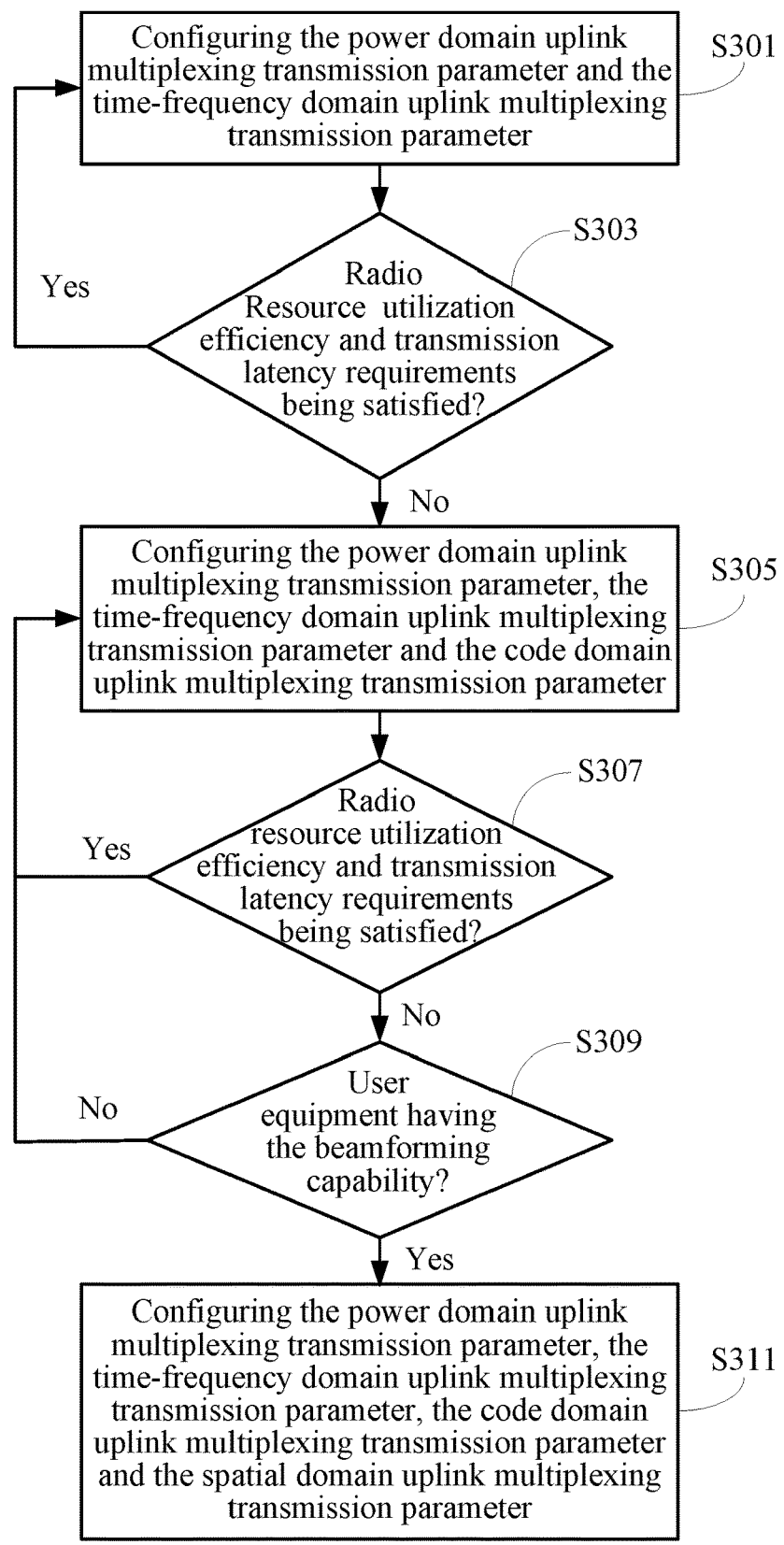
FIG. 3 depicts an implementation scenario of configuring non-orthogonal uplink multiplexing transmission parameters by the base station 1 according to the present invention.

A first embodiment of the present invention is as shown in FIG. 1 to FIG. 3. FIG. 1 depicts an implementation scenario of a communication system according to the present invention. FIG. 2A depicts an implementation scenario of signal transmission between a base station 1 and a user equipment 2a according to the present invention. FIG. 2B depicts another implementation scenario of signal transmission between the base station 1 and the user equipment 2a according to the present invention. FIG. 2C depicts another implementation scenario of signal transmission between the base station 1 and the user equipment 2a according to the present invention. It shall be appreciated that, signal transmission between the base station 1 and the user equipment 2a is taken as an example in FIG. 2a to FIG. 2c for illustration, and signal transmission between the base station 1 and other user equipments shall be appreciated by those of ordinary skill in the art based on the following description and thus will be not further described herein.

As shown in FIG. 1, the base station 1 in a wireless communication system has a signal coverage C, and user equipments 2a, 2b and 2c are all within the signal coverage C. To simplify the description, only three user equipments 2a, 2b and 2c are depicted in FIG. 1. However, the number of user equipments within the signal coverage C of the base station 1 is not intended to limit the present invention. The wireless communication system is adapted for use in next generation of mobile communication systems (broadly called 5G mobile communication systems currently), which may be mobile communication systems based on the orthogonal frequency division multiple access (OFDMA) technology. The user equipments 2a, 2b and 2c may be a smart phone, a tablet computer or any mobile communication device conforming to specifications of the mobile communication system, e.g., a user equipment supporting an ultra-reliable low latency communication (URLLC) service (which is called a URLLC user equipment hereinafter), a user equipment supporting an enhanced mobile broadband (eMBB) service (which is called an eMBB user equipment hereinafter), a user equipment supporting a massive machine type communication (mMTC) service (which is called an mMTC user equipment hereinafter), but not limited thereto.

The base station 1 performs a multi-user non-orthogonal uplink multiplexing transmission (MU-NOMT) configuration procedure based on a radio resource utilization efficiency so that uplink transmission of part of user equipments may be in a non-orthogonal multiplexing transmission configuration mode. Thereafter, based on a configuration result of the MU-NOMT configuration procedure, the base station 1 generates an uplink multiplexing transmission configuration message 102 carrying a power domain uplink multiplexing transmission parameter and a non-orthogonal uplink multiplexing transmission parameter.

For example, according to the number of user equipments which currently have established radio resource control (RRC) connection with the base station 1 and services required by the user equipments, the base station 1 may evaluate the radio resource utilization efficiency under the current orthogonal multiplexing transmission configuration mode, determine whether transmission latency requirements of the user equipments will be satisfied, or evaluate whether the current radio resource utilization efficiency is below a threshold, thereby determining whether to perform the MU-NOMT configuration procedure so that part of user equipments can transmit uplink data signals by using non-orthogonal radio resources. It shall be appreciated that, in this embodiment, if the uplink transmission of a user equipment is configured to be orthogonal, then it means that the radio resource used by the user equipment for uplink transmission is not overlapped with (i.e., is orthogonal to) the radio resources used by other user equipments for uplink transmission. On the contrary, if the uplink transmission of a user equipment is configured to be in a non-orthogonal uplink multiplexing transmission configuration mode, then it means that the radio resource used by the user equipment for uplink transmission is at least partially overlapped with (i.e., is not orthogonal to) the radio resources used by other user equipments for uplink transmission.

When the MU-NOMT configuration procedure is to be performed, the base station 1 may perform the MU-NOMT configuration procedure based on relevant information transmitted from the user equipment. For example, the base station 1 receives a measurement report message recording power measurement information and channel measurement information or a user equipment capability report message recording user equipment (UE) capability information from the user equipment. Taking the user equipment 2a as an example for illustration, the base station 1 receives a report message 202 from the user equipment 2a as shown in FIG. 2A. The report message 202 may be a measurement report message or a user equipment capability report message. The measurement report message is usually a message reported periodically so that the base station 1 can learn the current channel quality of the user equipment 2a according to the measurement report message. The user equipment capability report message is usually a message reported for one time so that the base station 1 can learn the capability of the user equipment 2a (e.g., a beamforming capability).

Thereafter, the base station 1 performs the MU-NOMT configuration procedure and transmits the uplink multiplexing transmission configuration message 102 to the user equipment 2a so that the user equipment 2a transmits an uplink data signal 204 to the base station 1 based on the uplink multiplexing transmission configuration message 102. Here it is assumed that the user equipment 2a is a URLLC user equipment, which can use the radio resource in a shared resource pool preconfigured by the base station 1 to transmit the uplink data signal 204 under an uplink grant-free situation. It shall be appreciated that, the base station 1 may transmit the uplink multiplexing transmission configuration message 102 to the user equipment 2a via one of unicasting, multicasting, or groupcasting. In other words, the uplink multiplexing transmission configuration message 102 may be a dedicated dynamic downlink control message to directly instruct the user equipment 2a to perform corresponding operations, or may be a group dynamic downlink control message so that the user equipment 2a may determine according to the uplink multiplexing transmission configuration message 102 whether it is associated with the message and then perform corresponding operations.

FIG. 3 depicts an implementation scenario of performing the MU-NOMT configuration procedure by the base station 1 according to the present invention. In this exemplary example, except for a power domain uplink multiplexing transmission parameter, other non-orthogonal uplink multiplexing transmission parameters comprise at least one of the following: a time-frequency domain uplink multiplexing transmission parameter, a code domain uplink multiplexing transmission parameter and a spatial domain uplink multiplexing transmission parameter. However, as shall be appreciated by those of ordinary skill in the art, other non-orthogonal multiplexing technologies can also be applied to the present invention. Moreover, in this exemplary example, the order in which the non-orthogonal multiplexing technologies are used is only taken as an example for illustration and is not intended to limit the present invention.

First, in step S301, when the base station 1 considers that the radio resource utilization efficiency needs to be improved to meet transmission latency requirements required by the services, the base station 1 configures a power domain uplink multiplexing transmission parameter and a time-frequency domain uplink multiplexing transmission parameter, and transmits the power domain uplink multiplexing transmission parameter and the time-frequency domain uplink multiplexing transmission parameter to the user equipment 2a by carrying them in the uplink multiplexing transmission configuration message 102. The power domain uplink multiplexing transmission parameter indicates that the user equipment 2a transmits the uplink data signal 204 at a power level. In this way, the base station 1 may perform demodulation and decoding on the uplink data signals sequentially based on different powers of the uplink data signals received from different user equipments, thereby improving the overall radio resource utilization efficiency. The base station 1 may determine whether the user equipment 2a is suitable for using the power domain non-orthogonal technology to transmit the uplink data signal according to the measurement report message received from the user equipment 2a, thereby configuring the power domain uplink multiplexing transmission parameter.

Additionally, the time-frequency domain uplink multiplexing transmission parameter indicates a radio resource pattern, and the user equipment 2a transmits the uplink data signal 204 on a specific radio resource according to the radio resource pattern. The time-frequency domain uplink multiplexing transmission parameter may directly record radio resource positions or record pattern serial numbers. If the time-frequency domain uplink multiplexing transmission parameter records the pattern serial numbers, then the base station 1 needs to inform the user equipment of information about various pattern serial numbers and corresponding radio resource positions in advance via multicasting transmission or dedicated transmission.

In the present invention, different radio resource patterns correspond to different radio resources, but these radio resources are partially overlapped with each other. Therefore, by allocating different radio resource patterns to different user equipments, the base station 1 can further improve the overall radio resource utilization efficiency. Meanwhile, in combination with different powers of the uplink data signals transmitted by the user equipments, the base station 1 is more likely to successfully obtain the uplink data signals through demodulation and decoding from the radio resources corresponding to different radio resource patterns, e.g., identifying the uplink data signal carried in the overlapped part of the radio resources by successive interference cancellation (SIC) so as to obtain the uplink data transmitted by each of the user equipments.

Moreover, the time-frequency domain uplink multiplexing transmission parameter may also indicate a plurality of radio resource patterns so that the user equipment 2a may select one of the radio resource patterns to transmit the uplink data signal 204 depending on the data transmission demand thereof. The time-frequency domain uplink multiplexing transmission parameter may record a plurality of pattern serial numbers. After selecting the radio resource pattern, the user equipment 2a may first transmit an uplink control message 206 to inform the base station 1 of the selected radio resource pattern, as shown in FIG. 2B. The uplink control message 206 may be transmitted on an uplink control channel. In addition to informing the base station 1 of the selected radio resource pattern by using the uplink control message 206, the user equipment 2a may also inform the base station 1 of the selected radio resource pattern by transmitting a preamble 208, as shown in FIG. 2C. In this case, some specific preambles and correspondence relationships between the preambles and the radio resource patterns shall be preconfigured in advance between the base station 1 and the user equipment 2a. Moreover, the specific preambles that have been preconfigured in advance between the base station 1 and the user equipment 2a may also serve as identification codes of the user equipment 2a.

Because the user equipment 2a is an URLLC user equipment which can use the radio resource in a shared resource pool preconfigured by the base station 1 to transmit the uplink data signal 204 under an uplink grant-free situation, the user equipment 2a may also inform the base station 1 of the radio resource that is selected from the shared resource pool via the uplink control message 206 or the preamble 208. For example, the positional correspondence relationship between the preamble radio resource for transmitting the preamble 208 and the radio resource for transmitting the uplink data signal 204 may be preconfigured in advance between the base station 1 and the user equipment.

In other embodiments, the present invention may further enable the user equipment to select a modulation and coding scheme (MCS) on its own depending on the data transmission demand thereof. In this case, the user equipment 2a may further inform the base station 1 of the selected MCS via the transmitted uplink control message 206 or the preamble 208. Additionally, each of the radio resource patterns of the present invention may also correspond to an MCS. Therefore, in addition to obtaining the MCS selected by the user equipment 2a via the uplink control message 206 or the preamble 208, the base station 1 may also attempt to perform demodulation and decoding on the uplink data signals on the radio resources corresponding to the radio resource patterns directly based on each radio resource pattern and its corresponding MCS, and perform cyclic redundancy check (CRC) so as to obtain the uplink data transmitted by the user equipment. In other words, in the present invention, when there is a preset corresponding relationship between the radio resource pattern and the MCS, it may be unnecessary to inform the base station 1 of the selected radio resource pattern or MCS via the uplink control message 206 or the preamble 208, and the base station 1 may directly attempt to perform demodulation and decoding on the uplink data signal based on the radio resource patterns allocated to the user equipment 2a and the MCSs corresponding to the radio resource patterns.

Next, in step S303, the base station 1 determines whether the radio resource utilization efficiency and the transmission latency requirements are satisfied according to the uplink data signals received from the user equipments and/or the number of user equipments currently connected to the base station 1. If the base station 1 determines that the transmission latency requirements of all the user equipments have been satisfied and the radio resource utilization efficiency of the overall system does not need to be further improved to meet transmission latency requirements required by the services in the case where only the power domain uplink multiplexing transmission parameter and the time-frequency domain uplink multiplexing transmission parameter are configured, then it means that the current uplink multiplexing transmission configuration mode does not need to be changed and may remain continuously. On the contrary, if the base station 1 determines that the current uplink multiplexing transmission configuration mode still cannot satisfy the transmission latency requirements of all the user equipments and it is necessary to improve the radio resource utilization efficiency to reduce the transmission latency, then in step S305, the base station 1 further configures a code domain uplink multiplexing transmission parameter in addition to the power domain uplink multiplexing transmission parameter and the time-frequency domain uplink multiplexing transmission parameter.

Similarly, the code domain uplink multiplexing transmission parameter may only indicate one code sequence. The code sequence is configured to spread the uplink data signal onto a plurality of resource blocks. The code sequence used may be the code sequence generated based on the code division multiple access (CDMA) technology, the sparse code multiple access (SCMA) technology, the interleave division multiple access (IDMA) technology or other code domain multiple access technologies. Therefore, the base station 1 may again generate an uplink multiplexing transmission configuration message 102 after further configuring the power domain uplink multiplexing transmission parameter, the time-frequency domain uplink multiplexing transmission parameter and the code domain uplink multiplexing transmission parameter, and inform the use equipment 2a of these configured uplink multiplexing transmission parameters.

Similarly, the code domain uplink multiplexing transmission parameter may also indicate a plurality of code sequences so that the user equipment 2a may select one of the code sequences to transmit the uplink data signal 204 depending on the data transmission demand thereof. The code domain uplink multiplexing transmission parameter may record a plurality of code sequence serial numbers. After selecting a code sequence, the user equipment 2a may first transmit an uplink control message 206 to the base station 1 to inform the base station 1 of the selected code sequence, as shown in FIG. 2B. Moreover, in addition to informing the base station 1 of the selected code sequence via the uplink control message 206, the user equipment 2a may also inform the base station 1 of the selected code sequence by transmitting the preamble 208, as shown in FIG. 2C. In this case, some specific preambles and correspondence relationships between the preambles and the code sequences shall be preconfigured in advance between the base station 1 and the user equipment 2a.

Furthermore, the present invention may have each code sequence correspond to an MCS instead of having each radio resource pattern correspond to an MCS, or may have correspondence relationships among the radio resource pattern, the code sequence and the MCS. Therefore, in addition to obtaining the MCS selected by the user equipment 2a via the uplink control message 206 or the preamble 208, the base station 1 may also attempt to perform the code domain demultiplexing, the demodulation and the decoding on the uplink data signals of the radio resources corresponding to the radio resource patterns directly based on the radio resource patterns, the code sequences and the corresponding MCSs, and perform cyclic redundancy check (CRC) so as to obtain the uplink data transmitted by the user equipment. In other words, in the present invention, when there is a preset corresponding relationship between the radio resource pattern and/or the code sequence and the MCS, it may be unnecessary to transmit the uplink control message 206 or the preamble 208, and the base station 1 may directly attempt to perform code domain demultiplexing, demodulation and decoding on the uplink data signal based on the radio resource patterns and the code sequences allocated to the user equipment 2a and the corresponding MCSs.

As described previously, the order in which other non-orthogonal uplink multiplexing technologies are configured is not limited in the MU-NOMT configuration procedure of the present invention. Therefore, in other embodiments, the base station 1 may also only configure the power domain uplink multiplexing transmission parameter and the code domain uplink multiplexing transmission parameter. In this case, if a plurality of uplink grant-free user equipments select the same radio resource from the preconfigured shared resource pool at the same time to transmit the uplink data signals thereof, then the base station 1 can still perform the code domain demultiplexing on the uplink data signals based on different code sequences to distinguish between uplink data signals transmitted by different user equipments. Similarly, the user equipment 2a may also inform the base station 1 of the radio resource selected from the shared resource pool via the uplink control message 206 or the preamble 208.

Thereafter, in step S307, the base station 1 again determines whether the radio resource utilization efficiency and the transmission latency requirements are satisfied according to the uplink data signal transmitted by the user equipment 2 and/or the number of user equipments currently connected to the base station 1. If the base station 1 determines that the transmission latency requirements of all the user equipments have been satisfied and the radio resource utilization efficiency of the overall system does not need to be further improved to meet transmission latency requirements required by the services in the case where only the power domain uplink multiplexing transmission parameter, the time-frequency domain uplink multiplexing transmission parameter and the code domain uplink multiplexing transmission parameter are configured, then it means that the current non-orthogonal uplink multiplexing transmission configuration mode does not need to be changed and may remain continuously. On the contrary, if the base station 1 determines that the current uplink multiplexing transmission configuration mode still cannot satisfy the transmission latency requirements of all the user equipments and it is necessary to improve the radio resource utilization efficiency to reduce the transmission latency, then the base station 1 needs to further configure other non-orthogonal uplink multiplexing transmission parameters.

In this case, in step 309, the base station 1 determines which user equipments have the beamforming capability based on the user equipment capability report messages received from the user equipments. If there is a user equipment having the beamforming capability, then the base station 1 configures the power domain uplink multiplexing transmission parameter, the time-frequency domain uplink multiplexing transmission parameter, the code domain uplink multiplexing transmission parameter and a spatial domain uplink multiplexing transmission parameter for the user equipment having the beamforming capability, as shown in step S311.

In the case where the user equipment 2a has the beamforming capability, the base station 1 again generates an uplink multiplexing transmission configuration message 102 after further configuring the power domain uplink multiplexing transmission parameter, the time-frequency domain uplink multiplexing transmission parameter, the code domain uplink multiplexing transmission parameter and the special domain uplink multiplexing transmission parameter, and informs the use equipment 2a of these configured uplink multiplexing transmission parameters. In this way, the user equipment 2a may further use a transmission beam of a specific direction to transmit the uplink data signal 204 based on the special domain uplink multiplexing transmission parameter. Therefore, the base station 1 forms corresponding reception beamforming for transmission beams coming from different directions to cancel interference from transmission beams coming from other directions, thereby improving the probability of successfully performing the code domain demultiplexing, the demodulation, and the decoding on the uplink data signals, improving the radio resource utilization efficiency and reducing the transmission latency.

As shall be appreciated by those of ordinary skill in the art, the MU-NOMT configuration procedure of the present invention performs the corresponding configuration on a plurality of specific user equipments. In other words, based on the channel quality of the user equipments, the base station 1 may determine which user equipments are suitable to be in the non-orthogonal uplink multiplexing transmission configuration mode and which user equipments are not suitable to be in the non-orthogonal uplink multiplexing transmission configuration mode. Moreover, in some non-orthogonal uplink multiplexing transmission configurations (e.g., the power domain uplink multiplexing transmission parameter and the time-frequency domain uplink multiplexing transmission parameter), the base station 1 performs the MU-NOMT configuration on user equipments in pairs.

For example, the base station 1 may configure the power domain uplink multiplexing transmission parameter so that an obvious difference in power level exists between the user equipment 2a and the user equipment 2b during the transmission of uplink data signals, and the base station 1 may configure the time-frequency domain uplink multiplexing transmission parameter so that the base station 2a and the base station 2b can select different but partially overlapped radio resources from the shared resource pool for the uplink data signal transmission. Additionally, in some non-orthogonal uplink multiplexing transmission configurations (e.g., the code domain uplink multiplexing transmission parameter and the spatial domain uplink multiplexing transmission parameter), the base station 1 may perform the MU-NOMT configuration on user equipments which may be not necessary in pairs. For example, the base station 1 may configure the code domain uplink multiplexing transmission parameter so that the user equipment 2a, the user equipment 2b and the user equipment 2c use different code sequences for uplink data signal transmission.

Moreover, how the user equipment generates the uplink data signal based on the non-orthogonal uplink multiplexing transmission configuration parameters (e.g., the time-frequency domain uplink multiplexing transmission parameter and the code domain uplink multiplexing transmission parameter) in combination with the non-orthogonal multiplexing technologies may be specified in advance by the base station 1 and the user equipment or may be instructed by the base station 1 along with the uplink multiplexing transmission configuration message 102. Various implementations in combination with the non-orthogonal multiplexing technologies shall be appreciated by those of ordinary skill in the art based on the above descriptions, and thus will not be further described herein.

On the other hand, it is assumed in the aforesaid embodiment that the user equipment 2a is a URLLC user equipment which can use the radio resource in a shared resource pool preconfigured by the base station 1 to transmit the uplink data signal 204 under an uplink grant-free situation. However, as shall also be appreciated by those of ordinary skill in the art, the MU-NOMT configuration of the present invention may also be applied to cases requiring uplink grant. For example, when the user equipment 2a, the user equipment 2b, and the user equipment 2c all request uplink transmission resources from the base station 1, the base station 1 may perform the MU-NOMT configuration to configure different power domain uplink multiplexing transmission parameters, time-frequency domain uplink multiplexing transmission parameters, code domain uplink multiplexing transmission parameters and spatial domain uplink multiplexing transmission parameters or any combination thereof for the user equipment 2a, the user equipment 2b and the user equipment 2c, thereby improving the overall radio resource utilization efficiency and reducing the latency in uplink data transmission of the user equipment.

Moreover, based on the report message received from the user equipment, the base station 1 may determine whether the current channel quality of the user equipment is suitable to be in the non-orthogonal uplink multiplexing transmission configuration mode. If it is unsuitable, then the base station 1 will reconfigure a dedicated orthogonal transmission resource to be used by the user equipment for subsequently transmitting the uplink data signal so that the user equipment returns to the orthogonal uplink multiplexing transmission configuration mode.

Figure 4:
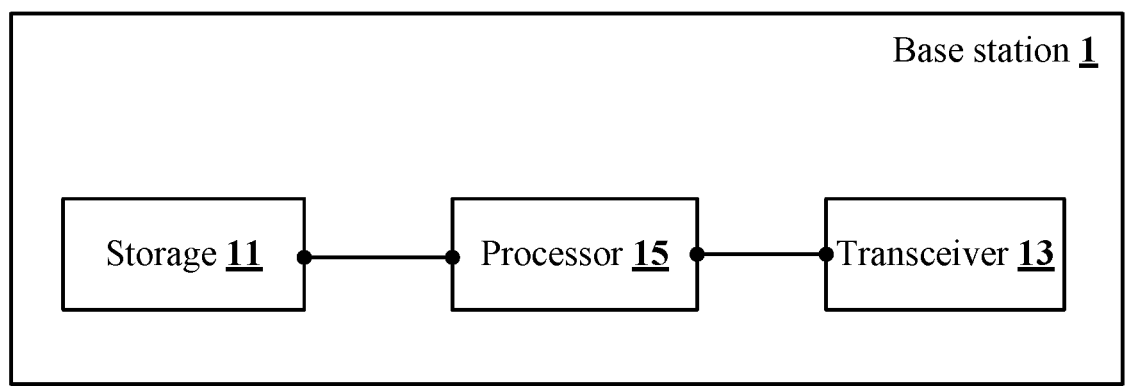
FIG. 4 is a schematic view of the base station 1 according to the present invention.

A second embodiment of the present invention is as shown in FIG. 4, which is a schematic view of a base station 1 according to the present invention. The base station 1 comprises a storage 11, a transceiver 13 and a processor 15. The processor 15 is electrically connected to the storage 11 and the transceiver 13. The processor 15 performs an MU-NOMT configuration procedure based on a radio resource utilization efficiency to generate an uplink multiplexing transmission configuration message (e.g., the uplink multiplexing transmission configuration message 102). As described in the first embodiment, the base station 1 may determine the radio resource utilization efficiency and determine whether the services required by the user equipments is uplink grant-free or not according to a number of user equipments and services required by the user equipments, thereby evaluating whether the current uplink multiplexing transmission mode can satisfy the transmission latency requirements of the user equipments.

The processor 15 may receive a report message from the user equipment (e.g., receive a report message 202 from the user equipment as shown in FIG. 2A) via the transceiver 13. The report message may be a measurement report message recording power measurement information and channel measurement information or a user equipment capability report message recording user equipment capability information. After determining that at least part of user equipments are suitable for performing the non-orthogonal uplink multiplexing transmission configuration according to the report message, the processor 15 performs the MU-NOMT configuration procedure, as shown in the exemplary example of FIG. 3.

After generating an uplink multiplexing transmission configuration message based on the MU-NOMT configuration procedure, the processor 15 transmits the uplink multiplexing transmission configuration message to the user equipment. The uplink multiplexing transmission configuration message carries a power domain uplink multiplexing transmission parameter and a non-orthogonal uplink multiplexing transmission parameter. The non-orthogonal uplink multiplexing transmission parameter comprises at least one of the following: a time-frequency domain uplink multiplexing transmission parameter, a code domain uplink multiplexing transmission parameter and a spatial domain uplink multiplexing transmission parameter. Thereafter, the user equipment may transmit the uplink data signal to the base station 1 based on the uplink multiplexing transmission configuration message.

In an embodiment, the time-frequency domain uplink multiplexing transmission parameter indicates a plurality of radio resource patterns so that the user equipment selects one of the radio resource patterns to perform the uplink data signal transmission, and the radio resources corresponding to the radio resource patterns are partially overlapped with each other. In an embodiment (e.g., the implementation scenario shown in FIG. 2B), the processor 15 further receives an uplink control message from the user equipment via the transceiver 13, and the uplink control message indicates the radio resource pattern selected by the user equipment.

Moreover, in an embodiment, each of the radio resource patterns may correspond to a modulation and coding scheme (MCS). In this case, the processor 15 further receives an uplink control message from the user equipment via the transceiver 13, and the uplink control message indicates an MCS, as shown in FIG. 2B. In another embodiment (e.g., the implementation scenario shown in FIG. 2C), the processor 15 may also receive a preamble from the user equipment via the transceiver 13, and the preamble indicates an MCS.

In an embodiment, the code domain uplink multiplexing transmission parameter indicates a plurality of code sequences so that the user equipment selects one of the code sequences and uses the selected code sequence to transmit the uplink data signal. In another embodiment (e.g., the implementation scenario shown in FIG. 2B), the processor 15 further receives an uplink control message from the user equipment via the transceiver 13, and the uplink control message indicates the code sequence selected by the user equipment. As described previously, each of the code sequences may correspond to an MCS, so the uplink control message received from the user equipment by the processor 15 via the transceiver 13 may further indicate an MCS. Moreover, in an embodiment (e.g., the implementation scenario shown in FIG. 2C), the processor 15 may also receive a preamble from the user equipment via the transceiver 13, and the preamble indicates an MCS.

Figure 5:
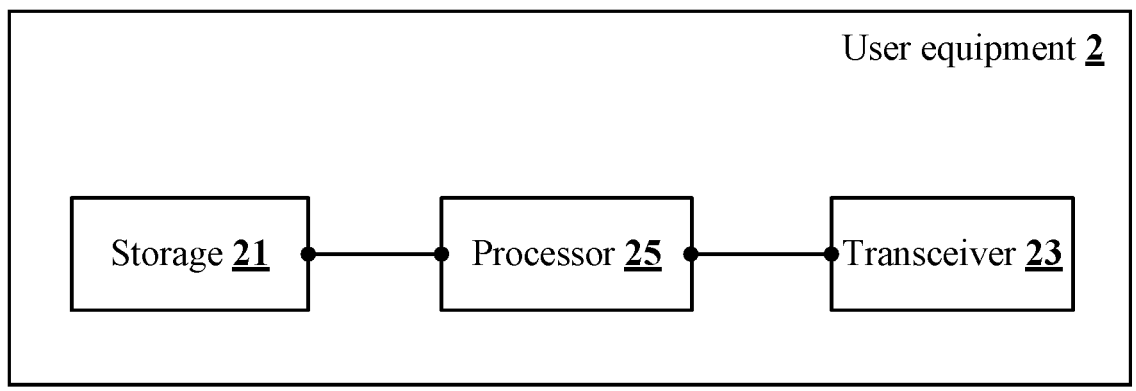
FIG. 5 is a schematic view of the user equipment 2 according to the present invention.

A third embodiment of the present invention is as shown in FIG. 5, which is a schematic view of a user equipment 2 according to the present invention. The user equipment 2 may be one of the user equipments 2a, 2b and 2c described in the first embodiment. The user equipment 2 comprises a storage 21, a transceiver 23 and a processor 25. The processor 25 is electrically connected to the storage 21 and the transceiver 23. The processor 25 receives an uplink multiplexing transmission configuration message (e.g., the uplink multiplexing transmission configuration message 102 of FIG. 2A) from a base station via the transceiver 23.

The uplink multiplexing transmission configuration message carries a power domain uplink multiplexing transmission parameter and a non-orthogonal uplink multiplexing transmission parameter. The processor 25 transmits an uplink data signal to the base station based on the uplink multiplexing transmission configuration message. The non-orthogonal uplink multiplexing transmission parameter comprises at least one of the following: a time-frequency domain uplink multiplexing transmission parameter, a code domain uplink multiplexing transmission parameter and a spatial domain uplink multiplexing transmission parameter.

In an embodiment, the time-frequency domain uplink multiplexing transmission parameter indicates a plurality of radio resource patterns so that the user equipment selects one of the radio resource patterns to perform the uplink data signal transmission, and the radio resources corresponding to the radio resource patterns are partially overlapped with each other. In an embodiment (e.g., the implementation scenario shown in FIG. 2B), the processor 25 further transmits an uplink control message via the transceiver 23, and the uplink control message indicates the radio resource pattern selected by the user equipment 2.

In an embodiment, when each of the radio resource patterns corresponds to a modulation and coding scheme (MCS), the processor 25 further transmits an uplink control message to the base station via the transceiver 23. The uplink control message indicates an MCS. Moreover, in an embodiment (e.g., the implementation scenario shown in FIG. 2C), the processor 25 may also transmit a preamble indicating an MCS via the transceiver 23.

In an embodiment, the code domain uplink multiplexing transmission parameter indicates a plurality of code sequences so that the user equipment 2 selects one of the code sequences and uses the selected code sequence to transmit the uplink data signal. In an embodiment (e.g., the implementation scenario shown in FIG. 2B), the processor 25 further transmits an uplink control message via the transceiver 23, and the uplink control message indicates the code sequence selected by the user equipment 2. In an embodiment, each of the code sequences may correspond to an MCS, so the processor 25 further transmits an uplink control message to the base station via the transceiver 23. The uplink control message indicates an MCS. Moreover, in an embodiment (e.g., the implementation scenario shown in FIG. 2C), the processor 25 may also transmits a preamble indicating an MCS via the transceiver 23.

Moreover, in an embodiment, the processor 25 may further determine whether the power domain uplink multiplexing transmission parameter and the non-orthogonal uplink multiplexing transmission parameter carried in the uplink multiplexing transmission configuration message do not satisfy a transmission demand (e.g., an uplink data amount demand, a service quality or the like). If it is determined that the power domain uplink multiplexing transmission parameter and the non-orthogonal uplink multiplexing transmission parameter carried in the uplink multiplexing transmission configuration message do not satisfy the transmission demand, the processor 25 may generate an uplink multiplexing transmission configuration report message and transmit the uplink multiplexing transmission configuration report message to the base station via the transceiver 23. The uplink multiplexing transmission configuration report message carried in the uplink control message (e.g., the uplink control message 206) or indicated by transmitting the preamble (e.g., the preamble 208) so that the base station may be informed of the uplink multiplexing transmission configuration report message. Therefore, the base station may reconfigure the power domain uplink multiplexing transmission parameter and the non-orthogonal uplink multiplexing transmission parameter and generate and transmit a new uplink multiplexing transmission configuration message to the user equipment 2 according to the uplink multiplexing transmission configuration report message, thereby satisfying the transmission demand of the user equipment 2.

According to the above descriptions, the uplink multiplexing transmission configuration mechanism of the present invention may enable the base station to perform a multi-user non-orthogonal uplink multiplexing transmission (MU-NOMT) configuration procedure based on a radio resource utilization efficiency so that the uplink transmission resources are at least partially overlapped or completely overlapped, and determine whether the current non-orthogonal uplink multiplexing transmission configuration mode satisfies the radio resource utilization efficiency and the transmission latency requirements so as to determine whether to configure more non-orthogonal uplink multiplexing transmission parameters for the user equipment, thereby further improving the overall radio resource utilization efficiency and reducing the latency in uplink data transmission of the user equipment.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station, comprising:
   a storage;
   a transceiver; and
   a processor electrically connected to the storage and the transceiver, being configured to execute the following operations:
   performing a multi-user non-orthogonal uplink multiplexing transmission (MU-NOMT) configuration procedure based on a radio resource utilization efficiency to generate an uplink multiplexing transmission configuration message, the uplink multiplexing transmission configuration message carrying a power domain uplink multiplexing transmission parameter and a non-orthogonal uplink multiplexing transmission parameter, the non-orthogonal uplink multiplexing transmission parameter comprising at least one of the following: a time-frequency domain uplink multiplexing transmission parameter, a code domain uplink multiplexing transmission parameter and a spatial domain uplink multiplexing transmission parameter, the code domain uplink multiplexing transmission parameter indicating a plurality of code sequences;
   transmitting the uplink multiplexing transmission configuration message to a user equipment via the transceiver so that the user equipment selects one of the code sequences and uses the selected code sequence to transmit an uplink data signal to the base station based on the uplink multiplexing transmission configuration message; and
   receiving an uplink control message from the user equipment via the transceiver, the uplink control message indicating the code sequence selected by the user equipment.

2. The base station of claim 1, wherein the time-frequency domain uplink multiplexing transmission parameter further indicates a plurality of radio resource patterns so that the user equipment further selects one of the radio resource patterns to perform the uplink data signal transmission, and the radio resources corresponding to the radio resource patterns are partially overlapped with each other.

3. The base station of claim 2, wherein each of the radio resource patterns corresponds to a modulation and coding scheme (MCS).

4. The base station of claim 2, wherein the uplink control message further indicates the radio resource pattern selected by the user equipment.

5. The base station of claim 2, wherein the processor further receives a preamble from the user equipment via the transceiver, and the preamble is selected by the user equipment and corresponds to the selected radio resource pattern.

6. The base station of claim 1, wherein each of the code sequences corresponds to an MCS.

7. The base station of claim 1, wherein the processor further receives a measurement report message from the user equipment via the transceiver, and the processor further performs the MU-NOMT configuration procedure according to the radio resource utilization efficiency and the measurement report message.

8. The base station of claim 1, wherein the processor further receives a user equipment capability report message from the user equipment via the transceiver, and the processor further performs the MU-NOMT configuration procedure according to the radio resource utilization efficiency and the user equipment capability report message.

9. The base station of claim 1, wherein the uplink control message further indicates an MCS.

10. The base station of claim 1, wherein the processor further receives a preamble from the user equipment via the transceiver, and the preamble indicates an MCS.

11. The base station of claim 1, wherein the processor further receives a preamble from the user equipment via the transceiver, and a preamble radio resource for the user equipment to transmit the preamble corresponds to a radio resource for the user equipment to transmit the uplink data signal.

12. A user equipment, comprising:
    a storage;
    a transceiver; and
    a processor electrically connected to the storage and the transceiver, being configured to execute the following operations:
    receiving an uplink multiplexing transmission configuration message from a base station via the transceiver, the uplink multiplexing transmission configuration message carrying a power domain uplink multiplexing transmission parameter and a non-orthogonal uplink multiplexing transmission parameter, the non-orthogonal uplink multiplexing transmission parameter comprising at least one of the following: a time-frequency domain uplink multiplexing transmission parameter, a code domain uplink multiplexing transmission parameter and a spatial domain uplink multiplexing transmission parameter, the code domain uplink multiplexing transmission parameter indicating a plurality of code sequences;
    selecting one of the code sequences to transmit an uplink data signal to the base station by using the selected code sequence based on the uplink multiplexing transmission configuration message; and
    transmitting an uplink control message via the transceiver, the uplink control message indicating the code sequence selected by the user equipment.

13. The user equipment of claim 12, wherein the time-frequency domain uplink multiplexing transmission parameter further indicates a plurality of radio resource patterns so that the processor further selects one of the radio resource patterns to perform the uplink data signal transmission, and the radio resources corresponding to the radio resource patterns are partially overlapped with each other.

14. The user equipment of claim 13, wherein each of the radio resource patterns corresponds to a modulation and coding scheme (MCS).

15. The user equipment of claim 13, wherein the processor further transmits a preamble to the base station via the transceiver, and the preamble is selected by the user equipment and corresponds to the selected radio resource pattern.

16. The user equipment of claim 13, wherein the uplink control message further indicates the radio resource pattern selected by the user equipment.

17. The user equipment of claim 12, wherein each of the code sequences corresponds to an MCS.

18. The user equipment of claim 12, wherein the uplink control message further indicates an MCS.

19. The user equipment of claim 12, wherein the processor further transmits a preamble to the base station via the transceiver, and a preamble radio resource for transmitting the preamble corresponds to a radio resource for transmitting the uplink data signal.

20. The user equipment, comprising:
a storage;
a transceiver; and
a processor electrically connected to the storage and the transceiver, being configured to execute the following operations:
receiving an uplink multiplexing transmission configuration message from a base station via the transceiver, the uplink multiplexing transmission configuration message carrying a power domain uplink multiplexing transmission parameter and a non-orthogonal uplink multiplexing transmission parameter;
transmitting an uplink data signal to the base station based on the uplink multiplexing transmission configuration message;
determining whether the power domain uplink multiplexing transmission parameter and the non-orthogonal uplink multiplexing transmission parameter carried in the uplink multiplexing transmission configuration message do not satisfy a transmission demand;
generating an uplink multiplexing transmission configuration report message and transmitting the uplink multiplexing transmission configuration report message to the base station via the transceiver if the power domain uplink multiplexing transmission parameter and the non-orthogonal uplink multiplexing transmission parameter carried in the uplink multiplexing transmission configuration message do not satisfy the transmission demand.

* * * * *